Sept. 24, 1957  R. J. WEIDNER  2,807,778
CAM ANGLE INDICATING CIRCUIT
Filed Feb. 8, 1954  2 Sheets-Sheet 1

INVENTOR.
RALPH J. WEIDNER
BY
ATTORNEY

Sept. 24, 1957 R. J. WEIDNER 2,807,778
CAM ANGLE INDICATING CIRCUIT
Filed Feb. 8, 1954 2 Sheets-Sheet 2

INVENTOR.
RALPH J. WEIDNER
BY
ATTORNEY

United States Patent Office 2,807,778
Patented Sept. 24, 1957

2,807,778

CAM ANGLE INDICATING CIRCUIT

Ralph J. Weidner, Kalamazoo, Mich., assignor to Allen Electric & Equipment Company, Kalamazoo, Mich., a corporation of Michigan Application February 8, 1954, Serial No. 408,720

5 Claims. (Cl. 324—28)

This invention relates to a duty cycle meter and particularly to a device for checking the "on time" and "off time" of contacts in an electric circuit, such as the breaker contacts in the ignition system of an internal combustion engine.

The term "cam angle," or "dwell" time, is utilized in the automotive service business to indicate the relationship between the total amount of time in a given cycle of engine operation that the breaker contacts are together as compared to the total time that said breaker contacts are separated. This has been conventionally ascertained in one type of apparatus by conducting current flowing through the breaker contacts to an integrating type of indicating device. The indicating device is then calibrated in terms of percentage of time and it will respond to pulses applied to it whenever the breaker contacts are closed and it will register in a manner to indicate the total time that said breaker contacts are closed as compared to the time that said breaker contacts are open. Another type of known apparatus operates the integrating meter by a battery of constant voltage, current therefrom being permitted to flow to the meter when the breaker contacts are in one position and being blocked when the breaker contacts are in the other position.

However, inasmuch as certain oscillatory voltages occur when said contacts separate, some of the pulses introduced into the measuring system are in a reverse direction as compared to the major pulse which effects, directly or indirectly, the operation of the meter and hence these reverse pulses fail to influence the indicating device in the intended manner. Thus, to this extent, the instruments utilized in conventional practice are inaccurate.

Further, even when the breaker contacts are closed, there may be a slight voltage drop across them which, with some types of present instrumentation, may register on the meter and cause the integrated reading to be inaccurate. Since the resistance between breaker contacts will vary from one engine to another, there is no practicable way known to adjust the meter calibration to eliminate this inaccuracy without creating other, worse, ones.

Accordingly, a principal object of the invention is to provide a cam angle indicator which will attain a maximum level of accuracy consistent with economical manufacture and simplicity of maintenance.

A further object of the invention is to provide a device, as aforesaid, which can be operated in substantially the same manner, insofar as the operator is concerned, as is now common in conventional systems.

A further object of the invention is to provide a cam angle measuring device which may be connected to an ignition system without regard to polarity.

A further object of this invention is to provide a cam angle measuring device which may be connected to 6, 12 or 24 volt ignition systems without regard to system voltage and without undue loading on the ignition system.

A further object of the invention is to provide a device, as aforesaid, which will not involve material additional expense over that incident to present devices.

A further object of the invention is to provide a device, as aforesaid, having no moving parts other than calibrating means and the necessary meter.

A further object of the invention is to provide a cam angle measuring device which will measure potentials occurring in the induction coil circuit in a reverse direction in the same manner as those occurring in the principal direction.

A further object of the invention is to provide a cam angle measuring device which will indicate all of the time during which the breaker contacts are closed.

A further object of the invention is to provide a cam angle measuring device which will indicate all of the time during which the breaker contacts are closed and which will not indicate during any appreciable part of the time the breaker contacts are open.

A further object of the invention is to provide a cam angle indicator which will operate without disconnecting any parts of the automobile engine and without affecting operation of the engine.

A further object of the invention is to provide a device, as aforesaid, which will require a threshold voltage to operate it whereby to eliminate inaccuracies due to variations in resistance between breaker contacts and without introducing other, worse, inaccuracies.

Other objects and purposes of the invention will be apparent to persons acquainted with apparatus of this general type upon a reading of the following description and inspection of the accompanying drawings.

In general, my invention consists in applying the voltage obtained from the induction coil circuit of an automobile engine through a type of rectifier-bridge circuit to an integrating and measuring circuit consisting of a meter and a source of constant potential. The bridge circuit receives voltage from the induction coil circuit and applies it to the measuring circuit to control the activation of said meter by said source of constant potential. The bridge circuit insures that all voltage present between the breaker contacts when the breaker contacts are open, even though some of it is in a reverse direction, is effective for controlling the integrating circuit. Thus, the meter is supplied with energy increments which are accurately proportioned according to the true length of time that the breaker contacts are closed and it will accordingly much more accurately represent the correct cam angle in any given case being investigated.

Figure 2:
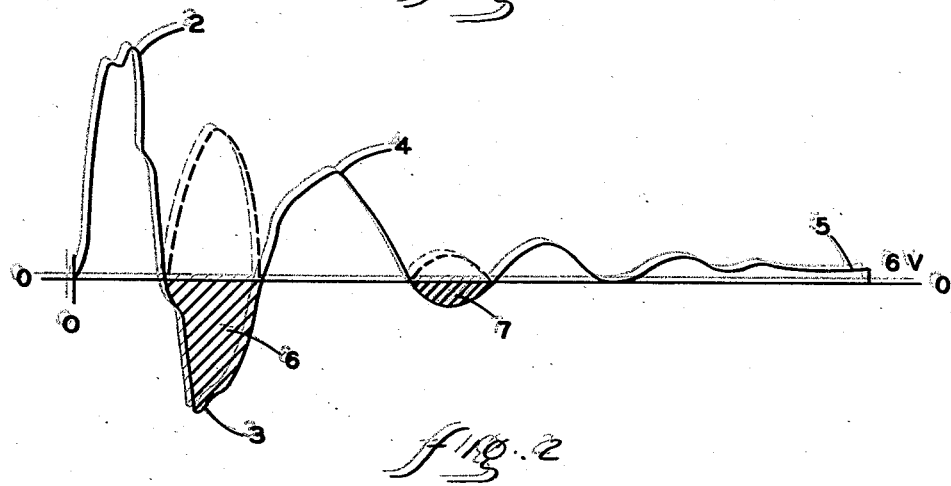
Figure 2 is a diagrammatic illustration of a single one of the voltage pulses shown in Figure 1 and illustrating the actual, alternating, pulses occurring during the time which it is desired to measure.
Figure 1:
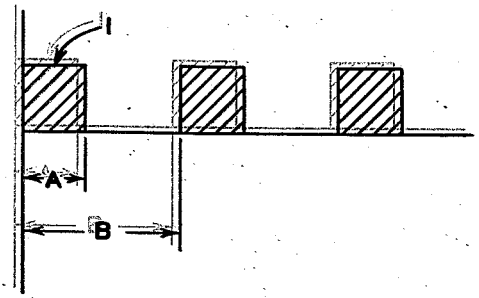
Figure 1 is a diagrammatic, idealistic, illustration of the pulses of voltage appearing across automotive distributor contacts.

Referring now to the drawings, there is illustrated schematically and ideally in Figure 1 the voltage in the induction coil circuit during the periods the breaker contacts are opened and closed. Each time the breaker contacts are open a potential appears between the terminals of the bridge circuit and this potential is utilized to block the flow of current originating in a constant voltage source and connected to a meter. Each time the breaker contacts are closed, no such blocking potential appears and the source supplies current to the meter. The meter will integrate the increments of current thus intermittently supplied to it into a constant reading which is proportional to the total time that current is supplied to the meter as compared to the toal time of a given cycle. Thus, the meter in effect will read the proportion existing between the space "A" and the space "B" as appearing in Figure 1. However, this assumes that the line 1 in Figure 1 is a straight line and registers a uniform magnitude of voltage whereas, as illustrated in Figure 2, in actual practice this is not the case. As the breaker contacts separate, oscillations are set up in the induction coil circuit which cause alternating voltage pulses to appear in said circuit at the beginning of each open period. Accordingly, the period "A," above mentioned, actually includes a few pulses, as 2, 3 and 4 (Figure 2), which occupy the first portion of the period "A" and it also includes the substantially steady line 5. Thus, these pulses provide periods, illustrated by the shaded areas 6 and 7, within the interval being measured during which there is no positive voltage at all applied to the meter circuit. This being the case, in conventional devices voltage from the constant source is not blocked during the total time that it should be blocked and current is accordingly supplied to the meter circuit for more time than it should be and the reading of the meter will not be an accurate representation of the ratio of A/B.

Figure 3:
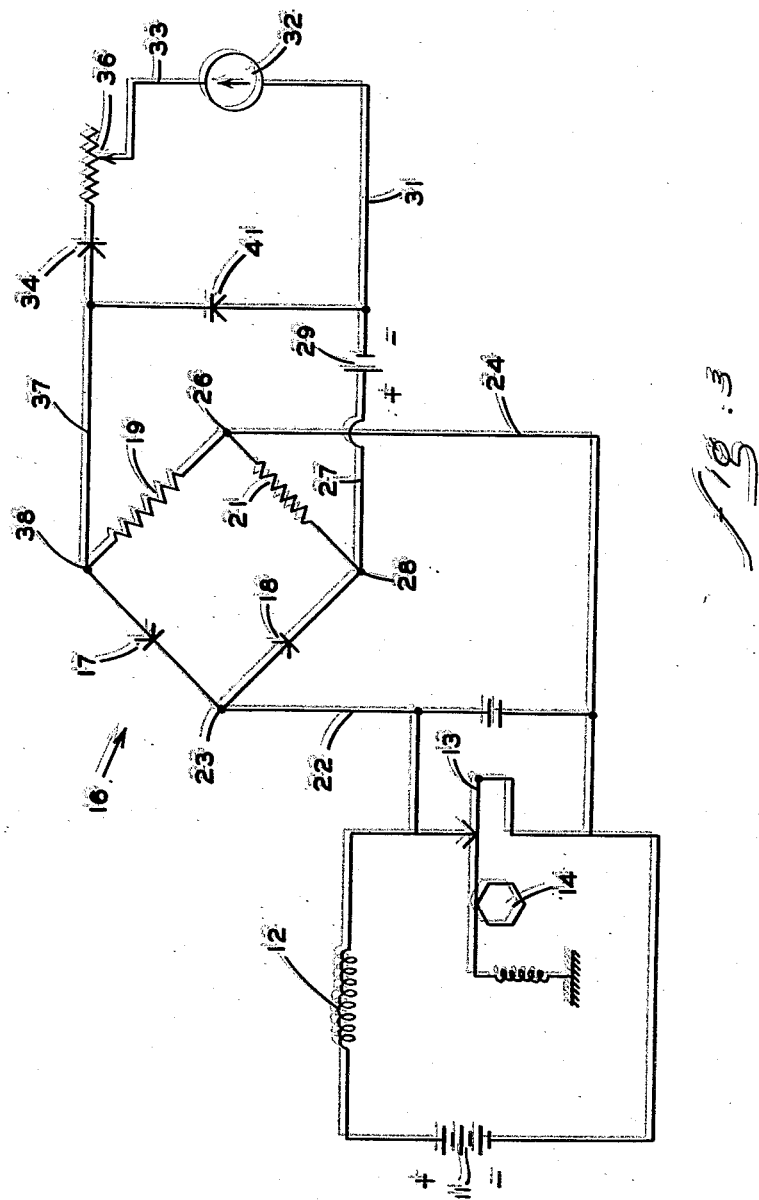
Figure 3 is a diagrammatic illustration of one example of circuitry embodying the invention.

Turning now to Figure 3 there is shown a voltage source 11 which will normally be the storage battery, or the generator, of the automobile whose engine is being investigated. The induction coil is indicated at 12 and the breaker switch is indicated at 13 driven in a conventional manner by the cam 14. The circuit thus far described is the circuit within the automobile engine which is to be tested and the information to be ascertained is the amount of time during which the switch 13 is closed as compared to the amount of time that said switch 13 is open.

For carrying out this investigation, there is provided a bridge circuit 16 comprising serially connected rectifiers 17 and 18 and comprising also serially connected resistances 19 and 21. Said rectifiers may be of any conventional type, dry disk, tube or other. A first lead 22 connects the terminal 23 of the bridge circuit 16 with one contact of the breaker switch 13 and a second lead 24 connects the other terminal 26 of the bridge circuit 16 to the other contact of the breaker switch 13. A conductor 27 connects the junction point 28 of the bridge circuit 16 to the positive side of a source of constant potential 29. Said source 29 is preferably a small, constant voltage, battery which may be conveniently of the type shown by Patent No. 2,422,045, but the particular battery so indicated is illustrative only and not limiting. The conductor 31 then connects the negative side of said source 29 to one side of the ammeter 32. Said ammeter may be of any conventional integrating type, such as the D'Arsonval type. The other side of said meter is connected through the conductor 33 to one terminal of the variable resistance 36. The other terminal of said variable resistance is connected through the rectifier 34 to the conductor 37 and thence to the junction point 38 of the bridge circuit 16. The meter may be calibrated as desired. A rectifier 41 is connected at its one side to the conductor 31 and is connected at its other side to a point between the rectifier 34 and the junction point 38. The polarity of the rectifier 34 is such as to permit flow of current from the junction point 38 to the meter 32 but to prevent flow of current in a reverse direction, and the polarity of the rectifier 41 is such as to permit flow of current from the conductor 31 to the conductor 37 and to prevent flow of current in the reverse direction.

The operation of the device will be readily understood. When breaker switch 13 is closed, substantially no voltage drop exists between the contacts thereof, and potential between terminals 23 and 26 likewise does not exist. Under these conditions, the battery 29 will cause a flow of current through the conductor 27 to the junction point 28 thence through the resistances 21 and 19 to the junction point 38, thence through the rectifier 34, the variable resistance 36, the meter 32 and back to the negative side of said battery.

When the breaker switch 13 is open, a voltage will appear across the contacts thereof. The oscillations will then occur as illustrated in Figure 2 with voltage above the reference line being taken as of such polarity when applied between the points 23 and 26 of the bridge circuit as to block flow of current from the battery 29 through the meter 32. The rectifier 18 is of such polarity as to permit flow of current from the terminal 23 to the junction point 28, i. e., in the direction corresponding to the pulse 2. The rectifier 17 permits flow of current from the junction point 38 to the terminal 23, i. e., in a direction opposite to the pulse 3.

When voltage is applied to the direction indicated by the pulse 2, current flows through the conductor 22 to the terminal 23 and thence to the junction point 28. From this junction point 28 current can then follow both of two paths to the terminal 26. It can flow directly through the resistance 21 and it can flow through the conductor 27 through the battery 29, around the meter 32 through the rectifier 41, through conductor 37 to the junction point 38, and finally through resistor 19 to the terminal 26. The potential producing this flow of current opposes and overcomes the potential of the battery 29 and by reason of the rectifier 34 current now fails to flow through meter 32 whenever the switch 13 is open.

An oscillation in the reverse direction, pulse 3, creates a positive potential directing current flow through the conductor 24 to the terminal 26, thence through the resistance 21 and to the battery 29, where the same situation exists for blocking flow of current from the battery 29 as in the case of pulse 2.

Thus, flow of current in response to the battery 29 through the meter 32 is blocked whenever the breaker switch 13 is open regardless of which way pulses flow therethrough.

Thus, each time the breaker switch is closed, current from the battery 29 will flow through the system and energize the meter 32 and each time the breaker switch is open, the flow of current from the battery 29 will be blocked. In this manner, the meter registers accurately the full time that the breaker switch is closed and the oscillations occurring at the beginning of each opening of the breaker switch will have no disadvantageous effect on the accuracy of the meter reading.

Further, when the voltage difference between the terminals 23 and 26 is less than one-half of the battery voltage, the presence of such a voltage difference has no effect on the flow of current from the battery through the meter. Thus, a small voltage drop across the breaker contacts will not affect the reading of the instrument and its accuracy is thereby still further improved.

The variable resistance 36 is provided for calibration purposes in a known manner.

Figure 4:
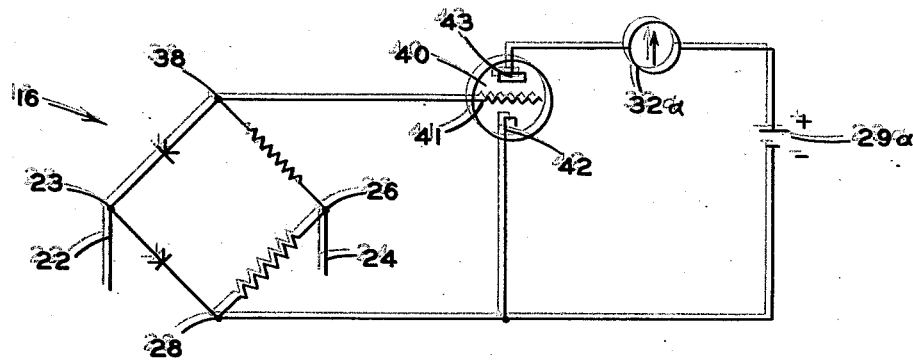
Figure 4 is a diagrammatic illustration of another example of circuitry embodying the invention.

While the foregoing described apparatus operates on the principle of utilizing the voltage between terminals 23 and 26 to block flow from the battery 29 although the actual circuit path is not broken, the major purposes of the invention will still be served by utilizing said voltage to open the battery meter circuit. Figure 4 illustrates a simple circuit of this latter nature. A switch, such as the space discharge device 40, is provided in series with the battery 29a and the meter 32a and this is rendered conductive or non-conductive by said voltage. Here the tube 40 is connected into the battery-meter circuit by its principal electrodes 42 and 43, its grid is connected to the negative end 38 of the bridge 16 and its cathode 42 is connected also to the positive end 28 of the bridge 16. Voltage differences appearing at terminals 23 and 26 when the breaker contacts open will block the tube 40 and when the breaker contacts are closed and substantially no voltage appears across the bridge, the tube will conduct and the meter will register. Thus the meter is caused to conduct whenever, but only whenever, the breaker contacts are closed in a generally similar manner to accomplish some of the same objectives as are set forth above in connection with the form shown in Figure 3. In this form also, a minimum, or threshold, voltage is require to effect blocking of the battery meter circuit.

While particular embodiments of the invention have been utilized for illustrative purposes, it will be appreciated that invention may be practiced in many other specific forms and such forms are contemplated within the terms of the hereinafter appended claims excepting as said claims may by their own terms expressly require otherwise.

I claim:

1. In a duty cycle measuring device for use with a breaker switch, the combination comprising: an integrating meter; first and second conductors extending from each terminal of said meter and including a first meter circuit rectifier and a first source of D. C. potential in series relation with each other, the polarity of said rectifier and said first source being such that said rectifier will permit the passage of current flowing from first source; a second meter circuit rectifier and circuitry connecting said second meter circuit rectifier with said first and second conductors in position for including said first source and said second meter circuit rectifier in series relation with each other, said second meter circuit rectifier shunting said first meter circuit rectifier and said meter, the polarity of said second meter circuit rectifier being opposed to the polarity of said first source; a bridge circuit including a pair of junction points, a pair of resistances connected in series between said junction points and a first bridge circuit rectifier and a second bridge circuit rectifier connected in similar polarity with respect to each other and in series between said junction points, a point between said resistances constituting one input terminal and a point between said bridge circuit rectifiers constituting a second input terminal, the free ends of said first and second conductors being connected respectively to said junction points and so connected that both of said bridge circuit rectifiers are in opposite polarity with respect to said first source; leads extending respectively from said input terminals for direct connection to the respective contacts of said breaker switch; a supply circuit including a second source of D. C. potential connected to the contacts of said breaker switch, said first source and the resistive components of the bridge circuit being of such magnitude with respect to the magnitude of the potential supplied by said supply circuit that, when the contacts of said breaker switch are open, the potential applied across said first source by said supply circuit will be of value at least as great as the potential supplied by said first source.

2. The device defined in claim 1 including a variable resistance in series circuit with said meter.

3. In a cam angle measuring device for use with a breaker switch, wherein the terminals of said breaker switch are connected to the ignition circuit for a vehicle, the combination comprising: a pair of input terminals; first and second resistances, each connected at their respective one ends to one of said input terminals; first and second bridge circuit rectifiers, the positive side of the first bridge circuit rectifier and the negative side of the second bridge circuit rectifier being connected to the other input terminal; a connection including a first junction point connecting the negative side of said first bridge circuit rectifier with the other end of said first resistance; a connection including a second junction point connecting the positive side of the second bridge circuit rectifier with the other end of the second resistance; circuitry, including a source of D. C. potential of predeterminable magnitude, a meter circuit rectifier and a current integrating meter all serially connected directly with each other, connected to and between said junction points, the polarity of said source and of said meter circuit rectifier being similar with respect to each other and opposed to that of said first and second bridge circuit rectifiers, said pair of input terminals being adapted for direct connection to the terminals of said breaker switch.

4. In a duty cycle measuring device for use with a rapidly operating on-off switch, the terminals of said on-off switch being connected to a circuit including a D. C. potential supply, the combination comprising: a pair of inpute terminals; first and second resistances, each connected at their respective one ends to one of said input terminals; first and second bridge circuit rectifiers, the positive side of the first bridge circuit rectifier and the negative side of the second bridge circuit rectifier being connected to the other input terminal; a connection including a first junction point connecting the negative side of said first bridge circuit rectifier with the other end of said first resistance; a connection including a second junction point connecting the positive side of the second bridge circuit rectifier with the other end of the second resistance; circuitry, including a source of D. C. potential of predeterminable magnitude, and a current integrating meter serially connected with each other and connected to and between said junction points, the polarity of said source being opposed to that of said first and second bridge circuit rectifiers, said pair of input terminals being adapted for direct connection to the terminals of said rapidly operating on-off switch.

5. In a duty cycle measuring device for use with a rapidly acting switch, the contacts of said rapidly acting switch being connected to a supply circuit whereby a first voltage is supplied to said measuring device or removed therefrom, depending on the condition of said rapidly acting switch, the combination comprising: a pair of input terminals connected to the contacts of said switch; first and second resistances, each connected at their respective one ends to one of said input terminals; first and second bridge circuit rectifiers, the positive side of the first bridge circuit rectifier and the negative side of the second bridge circuit rectifier being connected to the other input terminal; a connection including a first junction point connecting the negative side of said first bridge circuit rectifier with the other end of said first resistance; a connection including a second junction point connecting the positive side of the second bridge circuit rectifier with the other end of the second resistance; a meter circuit including a meter and source means for constantly energizing said meter in the absence of a minimum potential between said input terminals; connections respectively extending directly between each of said junction points and said meter circuit for applying more than said minimum potential to said meter circuit of opposite polarity with respect to said source means whenever said rapidly acting switch is open.

References Cited in the file of this patent

UNITED STATES PATENTS

| 2,221,591 | Lansdale | Nov. 12, 1940 |
| 2,254,175 | Eltgroth | Aug. 26, 1941 |
| 2,312,840 | Lansdale | Mar. 2, 1943 |
| 2,335,247 | Hanson | Nov. 30, 1943 |
| 2,335,248 | Hanson | Nov. 30, 1943 |
| 2,351,441 | Makuh | June 13, 1944 |